(12) United States Patent
Nimmo

(10) Patent No.: US 8,046,877 B2
(45) Date of Patent: Nov. 1, 2011

(54) DRYING OF SEED COTTON AND OTHER CROPS

(75) Inventor: Ronnie J. Nimmo, Lemoore, CA (US)

(73) Assignee: Jimmy R. Stover, Corpus Christi, TX (US), part interest ( * ) Notice: Subject to any disclaimer, the term of this patent is extended or adjusted under 35 U.S.C. 154(b) by 213 days.

(21) Appl. No.: 12/455,725

(22) Filed: Jun. 5, 2009

(65) Prior Publication Data

US 2010/0050392 A1    Mar. 4, 2010

Related U.S. Application Data

(60) Provisional application No. 61/190,106, filed on Aug. 26, 2008.

(51) Int. Cl.
*D01B 1/04* (2006.01)
(52) U.S. Cl. ...................................... 19/48 R; 19/66 CC
(58) Field of Classification Search ................... 19/48 R, 19/64.5, 66 CC; 34/259, 265; 219/678, 679, 219/698, 700
See application file for complete search history.

(56) References Cited

U.S. PATENT DOCUMENTS

| | | |
|---|---|---|
| 3,940,885 A | 3/1976 | Gray |
| 4,038,758 A | 8/1977 | Miller |
| 4,509,273 A | 4/1985 | Roisen |
| 4,631,380 A * | 12/1986 | Tran .............................. 219/697 |
| 4,640,020 A | 2/1987 | Wear |
| 4,649,055 A | 3/1987 | Kohlwey |
| 4,896,400 A | 1/1990 | Polli |
| 4,912,914 A | 4/1990 | Wingard |
| 4,999,926 A | 3/1991 | Knabenhans |
| 5,008,978 A | 4/1991 | Waeber |
| 5,048,156 A | 9/1991 | Waeber |
| 5,105,563 A | 4/1992 | Fingerson |
| 5,153,968 A | 10/1992 | Sterin |
| 5,156,570 A | 10/1992 | Justice, III |
| 6,212,736 B1 * | 4/2001 | Vandergriff .................... 19/64.5 |
| 6,536,133 B1 | 3/2003 | Snaper |
| 6,807,750 B1 * | 10/2004 | Lewis et al. ..................... 34/381 |
| 2007/0192997 A1 * | 8/2007 | Winn .......................... 19/66 CC |

OTHER PUBLICATIONS

Evaluate the Usefulness of Drying Green Bolls in Improving Early Season Yield Forecasts, U.S. Dept of Agriculture, Research and Development Division.

* cited by examiner

*Primary Examiner* — Shaun R Hurley
(74) *Attorney, Agent, or Firm* — G. Turner Moller

(57) ABSTRACT

A seed cotton dryer comprises an array of electromagnetic wave energy generators in a cotton gin and a cotton picker/stripper. An appropriate amount of energy is used to evaporate a considerable amount of moisture in the seed cotton without producing enough energy to pop the cotton seeds. Seed cotton dried by wave energy is much easier to separate the cotton seeds and lint from leaves, stems and other plant parts. The seed cotton is preferably transported through the dryer in a conduit having flat sides which reflects the wave energy more efficiently than through a round conduit. Provisions are made to prevent arcing in the transport conduit when extraneous metal pieces are inadvertently mixed with the seed cotton. In some embodiments, heated air from a diesel engine is used to dry crops as they are being harvested.

15 Claims, 3 Drawing Sheets

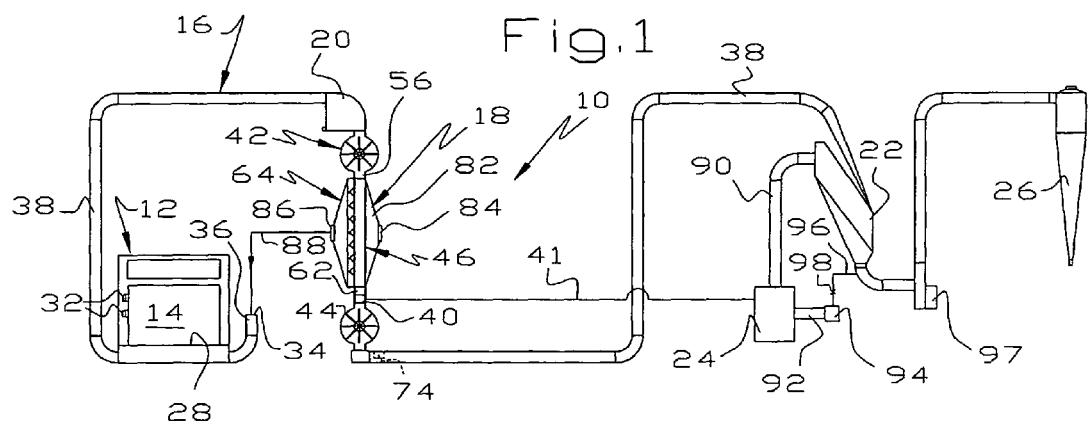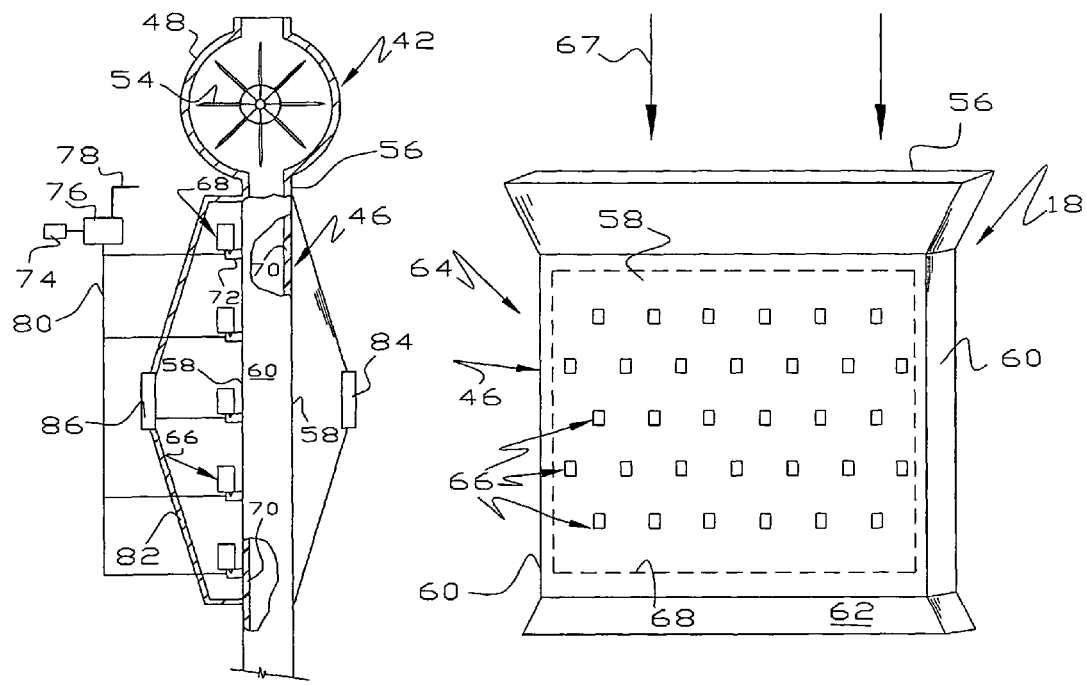

DRYING OF SEED COTTON AND OTHER CROPS

This application is partly based on Provisional Patent Application Ser. No. 61/190,106 filed Aug. 26, 2008 on which priority is claimed.

This invention relates to the drying of seed cotton and other crops.

BACKGROUND OF THE INVENTION

Cotton, wheat, corn, sorghum, soybeans, and hay or silage are typical crops that are widely grown. Harvesting these crops cannot be started in the morning until the sun has warmed the plants sufficiently to drive off dew or other moisture. Harvesting can continue until dew falls in late evening, typically long after the sun has gone down. Thus, there is a long period—often about 12 hours a day—when most crops cannot be harvested because the crop is too wet. The exact moisture conditions differ somewhat for different crops but the overall problem is the same, i.e. if the crop is too wet, harvesting has to wait because the wet crop will rot. Sorghum, corn and other grains are a particular problem because, when harvested too wet, they cannot be fed even to livestock because of the production of certain aflatoxins.

When cotton is picked or stripped in the field, a wide variety of things accumulate in a cotton module that is transported to a gin for ginning. Picked or stripped seed cotton produces a collection of cotton lint, motes, cotton seed and gin trash, which is the industry term for dirt, leaves, stems, weeds and weed seeds. Currently, seed cotton is dumped from a picker or stripper into a module builder on the edge of a field where a large rectangular module is created by tamping the seed cotton in a large metal container. A new generation of cotton pickers produces a module which is discharged on the field, eliminating the need for a separate module builder. One of the new generation of cotton pickers produces a plastic wrapped round module.

Picking of cotton from the field does not normally start until the morning sun warms the plants sufficiently to drive off any dew or other moisture. A moisture sensor is typically used to determine the moisture content of the plant so picking can be delayed until the moisture content in the seed cotton and debris falls below some predetermined value, typically around 12%. The reason is that, at higher moisture levels, there is a risk of plant debris rotting or excessive moisture causing microbial changes in cotton fibers resulting in staining which cannot be removed before the cotton is ginned because there is often a delay of up to several months from the time cotton is picked until it is ginned. When considerable rotting or staining occurs, the cotton fibers are degraded thereby reducing the grade of the ginned cotton and thus the price obtained for it.

The cotton modules are delivered to a cotton gin where the module is stored until the gin is ready for the particular module. The module is delivered onto the conveyor of a module feeder where it is disintegrated so cotton clumps pass into the gin where the lint is separated from cotton seeds and gin trash. One of the operations in a conventional cotton gin is to heat the unprocessed cotton enough to further reduce the moisture content. This is desirable because it is much easier to separate cotton and seed from leaves, stems and the like at low moisture levels as opposed to higher moisture levels. For example, conventional gin stands operate efficiently at moisture levels in the 4-6% range while roller gin stands operate best at much lower moisture levels. In the past, almost all gins have used a natural gas fired heater to heat the seed cotton and evaporate some or most of the water from the stream passing through the dryer.

It is known in the prior art to use microwaves to heat ginned cotton to counteract the effects of honeydew on cotton as shown in U.S. Pat. Nos. 4,896,400; 4,999,926; 5,008,978 and 5,048,156. It is known in the prior art to incorporate dryers in harvesters of hay, U.S. Pat. Nos. 4,912,914 and 5,105,563, and grains, U.S. Pat. Nos. 4,038,758; 4,509,273; 5,156,570; and 6,536,133. Of more general interest are the disclosures in U.S. Pat. Nos. 3,940,885; 4,640,020; 4,649,055 and 5,153,968. At least one attempt has been made to dry seed cotton in a cotton gin environment with microwaves but was unsuccessful because it popped the cotton seeds and the attempt was abandoned. Conventional domestic microwave ovens and conventional radio frequency ovens have been used to dry seed cotton in a laboratory in a research project to estimate cotton yields early in the season at a time before the bolls open.

SUMMARY OF THE INVENTION

It would clearly be a great advantage to farmers, and particularly to custom harvesters, to operate crop harvesters for longer periods and thereby increase the productivity of their equipment.

The newest diesel engines, particularly so called Tier 4 engines, produce an exhaust that is remarkably non-polluting, i.e it contains very little soot, unburned hydrocarbons or other pollutants. One concept is to use the exhaust from Tier 3 and Tier 4 diesel engines to dry products, particularly crops such as cotton, wheat, corn, sorghum, soybeans, hay or silage, almonds, pistachios and the like as they are being harvested by directly contacting the crop with the hot exhaust gas. There is nothing in the exhaust that will damage the products or impart an objectionable odor to the crop. In addition, the ability to remove moisture at the time of harvesting in a simple, inexpensive manner has many advantages. Using exhaust gases from newer diesel engines accomplishes this, either alone or in combination with heated air from other sources as discussed below, can accomplish this.

Another broad concept is to use heat given off on the exterior of the engine for drying crops. This is accomplished by providing a shroud on the outside of the engine and/or on the outside of the engine radiator and drawing atmospheric air through the shroud. This heated air, either alone or in combination with the diesel exhaust, is used on a harvester to dry crops.

In another aspect, a method and apparatus used in a cotton gin differs from the prior art by recognizing that popping of the cotton seeds was caused by too high energy levels concentrated in a small space, i.e. using a single high power magnetron or using multiple high power magnetrons which concentrated all of the power in a small space was the cause of popping.

In some embodiments, seed cotton may be dried by the application of wave energy from the electromagnetic spectrum, specifically by what is known as radio frequency heating and/or microwave heating. It has been found that wave energy heating is considerably more efficient than natural gas fired heaters in this application. Calculations done after short field trials using microwave magnetrons as the energy source suggest that energy savings are in the range of 40-70%. There are a variety of cumulative reasons which account for the magnitude of the savings.

From tests run in a gin with an early prototype microwave heater, it is apparent that separation of cotton seed and lint from gin trash is much easier and more efficient than with conventional natural gas fired dryers. Without being bound by any theory, it appears that this improvement is due to the dielectric properties of lint, trash and seed.

In some embodiments, an array of wave energy generators is used to produce a dispersed energy field having an energy density in the range of 0.2-6 kilowatts per pound of seed cotton. It has been learned that energy densities less than two tenths kilowatt per pound of seed cotton are not very effective in reducing moisture in seed cotton. Concentrated wave energy or energy densities greater than six kilowatts per pound of seed cotton tend to heat the seed cotton so much that the cotton seeds pop like popcorn and popped cotton seeds are not salable. In addition, modern cotton gins are not equipped to separate lint from popped cotton seeds.

In a cotton gin environment, some of the dryer embodiments of may be housed in conduits between conventional equipment in the gin or, preferably, in a feed controller near the upstream end of the gin. In some embodiments, the conduit or feed controller may be of metal having flat sides, such as square or rectangular conduit, and may be lined with a material of a type that prevents arcing when stray metal pieces pass through the dryer. One reason the preferred location for the dryer may be in the feed controller is because the conventional air locks upstream and downstream of the feed controller may be modified in accordance with some embodiments to prevent escape of microwaves past the air locks.

In a cotton picker/stripper environment, an important advantage of the dryer is that picking or stripping can be started before the sun warms the plant sufficiently to lower the moisture content enough to prevent rotting. Indeed, sufficient drying can be accomplished to allow picking or stripping throughout the day and/or night thereby increasing the utilization of equipment and thereby lowering unit costs. In addition, it will be apparent that 24 hour operation is overwhelmingly attractive in areas that are subject to hurricanes. Cotton farmers become exceedingly antsy with a crop in the field and a tropical storm en route. Long periods of operation are also overwhelmingly attractive to custom harvesters.

Another important advantage of the seed cotton dryer, in a cotton gin environment, is the complete absence of combustion products, except in unusual situations where the cotton is so wet that conventional natural gas heating is also required or in the situation where diesel exhaust is used as a primary or supplementary heating source, as disclosed in greater detail hereinafter. In any event, there is a substantial reduction in pollutants escaping to the atmosphere. This is particularly advantageous in areas such as California where increasingly strict regulations restrict the use of natural gas fired dryers and/or increase their cost of operation.

It is an object of this invention to provide an improved method and apparatus for drying seed cotton.

Another object of this invention is to provide an improved method and apparatus for drying seed cotton either on a picker/stripper or in a cotton gin.

A further object of this invention is to provide an improved method and apparatus for drying seed cotton which promotes separation of the cotton and seed from leaves, stems and other plant parts.

Another object of this invention is to provide an improved method and apparatus for drying crops using the exhaust from diesel engines.

These and other objects and advantages of this invention will become more fully apparent as this description proceeds.

BRIEF DESCRIPTION OF THE DRAWINGS

FIG. 1 is a schematic view of part of a cotton gin illustrating one embodiment of a seed cotton dryer;

FIG. 2 is an enlarged view of the upper end of the flow controller of FIG. 1, partly in section, illustrating an air lock and several magnetrons;

FIG. 3 is an isometric rear view of a feed controller into which a dryer is incorporated;

DETAILED DESCRIPTION OF THE INVENTION

Figure 4:
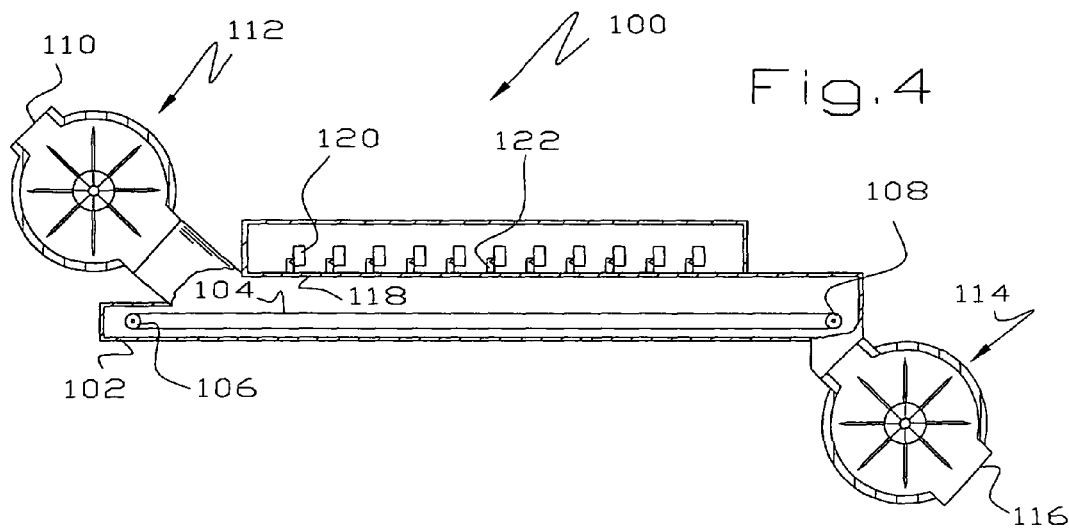
FIG. 4 is a cross-sectional view of a conventional belt conveyor into which a dryer is incorporated.

Referring to FIGS. 1-3, there is illustrated part of a conventional cotton gin 10 comprising, as major components, a module feeder 12 for disintegrating a cotton module 14, a transport system 16 for delivering cotton clumps from the module feeder 12 through the various components of the gin 10, a feed controller 18, a series of separators or cleaners 20, 22 for separating cotton seed and lint from plant debris, one or more gin stands 24 for separating cotton seed from lint and one or more separators or cyclones 26 for separating gin trash from conveying air.

The module feeder 12 may be of any conventional type and typically includes an inlet conveyor 28 on which a rectangular or round module 14 is moved toward a plurality of disperser drums 32 which disintegrate the module 14. Cotton clumps from the module 14 are moved by the transport system 16 through the various components of the gin 10.

In some embodiments, the transport system 16 is pneumatic in the sense of having an air inlet 34 and a fan 36 pushing air through a series of conduits 38 provided by the transport system 16 thereby moving the cotton clumps toward or through the various components of the gin 10.

Most, but not all, conventional cotton gins include a separator/cleaner 20 near the module feeder 12 for removing large trash from the stream of material exiting the module feeder. Many gins include a feed controller 18 near the inlet end of the transport system 16 having the capability of accumulating seed cotton and then withdrawing the accumulated seed cotton for the purpose of keeping the gin stands 24 full. To this end, manipulating a series of feed rollers 40 near the discharge end of the feed controller 18 increases or decreases the flow of seed cotton from the controller 18 typically in response to a feedback loop 41 from the gin stands 24. Air locks 42, 44 are conventionally provided in gins employing air conveyed cotton near the inlet and outlet ends of the feed controller conduit 46 to prevent loss of conveying air while allowing cotton to continue moving through the gin 10.

Air locks work by sealing an elongate conveyance area, which is round in cross-section, with a rotary array of rubber wipers that allow seed cotton and trash to pass through a round chamber while sealing off the conveyance area and thereby preventing air loss. It is possible that standard air locks might leak microwave or radiofrequency energy so, in some embodiments, the interior of the arcuate housing 48 is designed to prevent wave energy leakage. If this is a problem, the wipers 54 and metal housing 48 are made to such close tolerances that there is no leakage.

As shown best by a comparison of FIGS. 1 and 4, in some embodiments the feed controller conduit 46 is of rectangular cross-section having a funnel shaped inlet 56 spanning the width of the air lock 42, a pair of flat parallel side walls 58, a pair of flat parallel end walls 60 and an outlet 62 which can be of any suitable shape, including a conventional funnel, in which the feed rollers 40 are located. The optimal shape of the conduit 46 may vary and much depends on the capacity of the gin or the speed of cotton moving through the conduit 46. The depth of penetration of the waves is a function of the frequency of the wave generator and it is desirable for the wave energy to penetrate the seed cotton moving in the conduit 46. In many embodiments, feed controller conduits 46 are much wider than they are deep, as shown best by a comparison of FIGS. 2 and 3. In many embodiments, the side and end walls 58, 60 need not be square or rectangular but they are preferably some type polygon because the angle between flat walls scatter wave energy better than round or smoothly curved walls.

Conventionally, the unprocessed seed cotton and plant debris is dried by burning natural gas and delivering the hot combustion products to the inlet 34 of the transport system 16 so the seed cotton is heated to evaporate some or most of the water absorbed on the seed cotton and plant parts. Typically, there is considerable heat loss because of conduction, convection and radiation from the conduits transporting the combustion products plus heat loss from air leaks which can reach as high as 30%.

In some embodiments, seed cotton and trash are heated by wave energy in the electromagnetic spectrum. In some embodiments, the wave energy generators can be placed in the conduits 38 of the transport system 16 or in a belt dryer as disclosed hereinafter. Preferably, the wave generators are placed upstream from a cleaner or stick machine because dried seed cotton separates much more easily from trash than moist seed cotton and seed cotton dried by the application of wave energy separates much better than seed cotton dried by natural gas fired heaters. One of the unusual features of cotton dried by wave energy is the ease of separating trash from seed cotton. Preferably, the wave energy generators are located in or are a part of the feed controller 18 or, in gins not having a feed controller, near the module feeder so the first cleaner works better. Regardless of the position of the dryer 64, it is much preferred that the conduit to which wave energy generators are attached comprise a series of flat connected walls. Round or smoothly curved conduits, although operative, do not scatter wave energy as effectively as flat walled conduits. In some embodiments a multiplicity of relatively small capacity wave energy generators 66 are placed in a grid or array on one of the large flat side walls 58 of the feed controller conduit 46. As will become more fully apparent hereinafter, the wave energy source is preferably dispersed to provide a relatively large area that is heated thereby preventing overheating of cotton seed to the extent that the seed pops.

In some embodiments, the wave energy generator are radio frequency generators producing frequencies, for example, preferably in the range of 13.56-40.68 mHz. In some embodiments, the wave energy generators are microwave magnetrons producing frequencies, preferably in the range of 915-2450 mHz or wave lengths in the range of 24-4.5 inches which is a very small part of the electromagnetic spectrum of 300 mHz to 3 gHz. It will be apparent that there is a very wide range of frequencies that are operative to heat water on the seed cotton passing through the dryer.

The power output of each individual wave energy generator can vary considerably, depending on the design volume throughput, the assumption made about inlet moisture content, the desired outlet moisture content, the spacing between the various generators 66 in the array and the exact pattern of the generators 66. In some embodiments, the array is a series of lines of generators where each line is offset by one half the spacing between generators, as shown in FIG. 4. In some embodiments, as shown in FIG. 4, the generators 66 are offset or staggered in the direction 67 of movement through the feed controller 18 and perpendicular to the direction 67. In embodiments where the generators 66 are of the same capacity, the pattern of the generators 66 tends to be regular, i.e. spaced equidistantly from each other. In embodiments where the generators are of different capacity, the pattern may be substantially nonuniform. One factor increasing the efficiency of the dryer is that the heat source is directly on the conduit 46 transporting cotton clumps in contrast to the conventional situation where the natural gas fired dryer is necessarily many feet away from the transport conduit. This inherently reduces heat losses from conduction, convection, radiation and air leaks.

There are upper and lower limits for the effective use of wave energy heating of seed cotton. There are a number of ways of expressing these limits. One problem is that no reasonably accurate measurements are made in a gin environment of the total weight of material being processed. Weight or volume measurements are made of cotton lint, seed cotton and cotton seeds. Roughly 1500 pounds of seed cotton produces 500 pounds of lint, 700-800 pounds of seed and 200 pounds of trash, condensed water and motes. Given the quantity of cotton lint being ginned, experienced people can make a reasonable estimate of the range of cotton seeds and gin trash being handled. Thus, it is estimated that the quantity of cotton seeds and gin trash in normal picked cotton is about 200% by weight of the amount of cotton lint. Stripped seed cotton, as contrasted to picked cotton, contains considerably more trash, e.g. 20-30% more than in picked seed cotton. What is known in a gin environment is the weight and/or volume of cotton lint being produced by the gin and is normally expressed in bales/hour. Currently, a bale is nominally 500 pounds of cotton lint.

A convenient expression for power output is the wattage of the wave energy generators. As is apparent from the particular pattern of FIG. 4, the generators produce a dispersed, as contrasted to a concentrated, energy that is reasonably averaged, both by the number and pattern of the generators 66 and because of scattering of energy waves inside the conduit 46. In effect, there is a energy distributing zone 68 where the energy delivered by the generators 66 is more-or-less constant per unit area.

In some embodiments, the wave energy generators 66 produce a dispersed energy field having an energy density in the range of 0.2-6 kilowatts per pound of seed cotton. It has been learned that energy densities less than two tenths of a kilowatt per pound of seed cotton is not very effective in reducing moisture in seed cotton. Energy densities greater than six kilowatts per pound of seed cotton tends to heat the seed cotton so much that the cotton seeds pop like popcorn.

Another way of expressing the energy density of the wave energy source is in kilowatts per unit area of an energy distributing zone 68 where the outer boundaries are about one half the distance between generators 66. It will be realized that the residence time of seed cotton in the conduit 46 has a substantial bearing on the total amount of energy delivered to the seed cotton. Residence time accordingly has a place in controlling or limiting the amount of wave energy applied to the seed cotton. It has been found with reasonable residence times that energy densities of less than about 0.3 kilowatts per square foot are not very effective to reduce moisture content in seed cotton while energy densities of greater than ten kilowatts per square foot is so great that overheating of the seed cotton is likely. In a prototype, having the generator array of FIG. 4, the energy distributing zone 68 had the capacity to deliver 48,000 watts over an area of twenty one square feet or an average of 2.286 kilowatts per square foot. This prototype was tested in a gin having a throughput of about 5000 pounds or ten bales of lint per hour which is about 15,000 pounds of seed cotton per hour, meaning that the energy density of the prototype was about 230 watts per square foot per bale of lint per hour or about 0.0153 watts per square foot per pound of seed cotton per hour. Short test runs reduced the moisture content of seed cotton significantly by amounts that correlated with the energy input from the generators 66.

Another factor affecting the desired amount of energy input is the depth of the conduit 46 in a direction perpendicular to the side walls 58 or parallel to the end walls 60. It will be apparent there is some distance perpendicular to the side walls 58 where wave energy will largely be absorbed before it reaches the opposite side wall. In these circumstances, there will be a tendency for seed cotton near the wall having the array of generators to be overheated while seed cotton near the opposite wall will be underheated. Although both side walls 58 might be equipped with an array of wave energy generators, it is preferred to make the conduit 46 relatively thin as shown by the contrast of the size of the side and end walls 58, 62. This spreads the stream of seed cotton sufficiently for the generators 66 to effectively heat the absorbed water thereby promoting the efficiency of the dryer 64. Although the depth of the conduit 46, i.e. the size of the end walls 60, may vary considerably, a depth of 6-12 inches for a dryer with generators 66 only on one side seems satisfactory for a microwave generator operating at a frequency of 2450 mHz. This, of course, is subject to considerable variation depending on a variety of factors, one of which is the frequency of the wave energy generator and another of which is the rate of cotton movement through the conduit 46.

Because it is desirable to spread out the seed cotton passing through the dryer 64, there is a range of desirable shapes for the conduit 46. Typically, the width of the conduit 46 is preferably on the order of 4-10 times the depth. In other words, the side walls 58 are preferably 4-10 times the size of the end walls 60 and the length or height of the conduit 46 determines the average residence time in the dryer.

Another important advantage of wave energy heating, particularly in the microwave range, is the tendency of water to absorb the energy of microwaves in preference to oils, sugars or fats which are also present in the seed, seed coating, leaves, stems and other plant parts which is believed to be a function of their dielectric properties. Accordingly, cotton seed doesn't heat up so much because water preferentially absorbs the wave energy. This is thought to be a substantial factor in the improved efficiency of wave energy drying of seed cotton because the weight of cotton seed is such a large fraction, typically about half, of the total weight through the dryer. Thus, microwaves preferentially heat water and thereby efficiently evaporate water from the seed cotton and trash passing through the dryer. This undoubtedly contributes to the efficiency of wave energy heating when contrasted to heating with conventional natural gas dryers along with the difference in surface moisture and hygroscopic traits of cotton fibers. In tests run through the prototype device, gin trash seemed to jump away from seed cotton. The correct explanation for the tendency of gin trash to separate from unginned cotton bolls is not known but it is believed to be related to a lower moisture content than is normally achieved with natural gas fired dryers and may be due to the ability of microwave energy to removed moisture embedded deeply within seed cotton and trash. Without being bound by any theory, it appeared almost as if the gin trash had an opposite static electric charge than the unginned cotton bolls although this explanation is difficult to believe. How this could be is not known. To improve separation of trash from seed cotton, it is desirable that the wave energy dryers be located upstream from the separators.

Another important advantage of some embodiments is shown in FIG. 2 where the inside of the conduit walls 58, 60 includes a lining 70, usually plastic, having non-arcing properties. Metal pieces or particles are occasionally found in seed cotton modules. These pieces were either picked up off the ground during harvesting or were originally part of the harvesting and/or module building equipment. Even though magnetic separators can be incorporated into the separator/cleaner 20, or further upstream, it is possible for both magnetic and especially non-magnetic metal particles, such as aluminum, to pass into the gin 10. When metal particles appear adjacent the microwave generators 66, in the absence of some type arcing protection, arcing can occur inside the conduit 46 thereby creating a fire hazard because of the wealth of small flammable particles and air inside the conduit 46. To overcome this problem, the liner 70 is provided of non-arcing material of a suitable thickness to keep stray metal away from the walls of the conduit 46 and providing the additional advantage of isolating the magnetrons 66 from dust and debris in the conveyed seed cotton. Although there are a wide variety of non-arcing materials for this purpose, a suitable material is known as UHMW which is ultrahigh molecular weight polyethylene. Other suitable materials generally have dielectric properties similar to or less than ultrahigh molecular weight polyethylene. For example, plexiglass proved not to be suitable because the plexiglass burned.

It will accordingly be seen that incorporating the dryer 64 into the flow controller 18 has the effect of using several components for different functions. For example, the conduit 46 acts as a surge capacity for the gin 10 in the normal manner of a flow controller, as does the conveyor of FIG. 4 as will be apparent hereinafter, and also acts as the drying zone and as an anchor for the generators 66. Similarly, the air locks 42, 44 prevent the loss of air from the transportation system 16 and also provides a safety feature by preventing the escape of microwave energy. In embodiments where the generators 66 are microwave generators, they may be mounted on wave guides 72 affixed to the wall 58 of the flow control conduit 46 as shown best in FIG. 2.

A major advantage of wave energy drying of seed cotton is the ability to quickly adjust the amount of energy being delivered to the seed cotton. As shown in FIGS. 1 and 2, a sensor 74 may be provided in the conduit 38 downstream of the heater 64 to measure the temperature, the humidity or other parameters related to drying of the seed cotton. The sensor 74 connects to a control unit 76 having an input 78 for indicating a desired value for one or more of the control parameters and an output 80 for controlling the amount of energy delivered to the generators 66 in response to inputs from the sensor 74. It will evident that the time lapse between adjusting the energy input to the heater 64 and seeing a change in the parameter is much shorter than with conventional gas fired dryers.

Another major advantage of using wave energy for drying seed cotton is the absence of combustion products. This is in contrast to conventional natural gas fired heaters which produce a great deal of carbon dioxide in a short ginning season.

A further advantage of using wave energy for drying seed cotton is an improvement in drying efficiency, i.e. producing more moisture reduction for less energy expenditure. This is a function of a variety of factors, such as the reduction in heat losses from the location where it is generated to the location where it is used, the tendency of wave energy to be preferentially absorbed by water so the effect of the applied energy is focused on what is desired to be removed and the ability to quickly adjust the amount of energy applied to seed cotton as temperature and moisture content of the crop varies. Tests run during short field trials using microwave magnetrons as the energy source produced results such as shown in Table 1:

TABLE 1

In a gin operating at 10 bales/hour, thirty two magnetrons were used at 1500 watts each to dry seed cotton. This is 48 kw at a then current cost of $.08 cents/kwhr to dry 5000 pounds of lint which amounts to an energy cost of $.38/bale.
The microwave heater used replaced a gas fired heater using an average of 2.5 therms/bale at a then current cost of $.61/therm for an energy cost of $.81/bale.

As shown in FIG. 1, in some embodiments, the heater 64 may be provided with a shroud 82 having an inlet opening 84 and an outlet opening 86 connected to the air inlet 34 by a suitable conduit 88. Air flowing through the shroud 82 picks up heat produced by the wave generators 66 and becomes part of the conveying air transporting seed cotton to the heater 64 thereby preheating the seed cotton and improving overall efficiency to here Operation of the gin 10 should now be apparent. The module feeder 12 digests the cotton module 14 so conveying air from the fan 36 transports seed cotton through the separator 20, in those gins having a separator at this location, where large trash is removed from the seed cotton. Sometimes, the seed cotton passes rapidly through the feed controller 18 and sometimes there is a longer residence time in the controller 18. In any event, the wave generators 66 deliver wave energy through the distributing zone 68 and heat the seed cotton in the conduit 46. This causes some liquid water in the seed cotton to evaporate, the amount of which depends on the amount of energy applied to the seed cotton, the time that energy is applied, the geometry of the heating chamber and a number of other factors as will be apparent to those skilled in the art.

Heated seed cotton and high humidity air exit the conduit 46 and pass through the air lock 44 and into the conduit 38 downstream of the air lock 44. It is necessary to separate the high humidity air from the seed cotton so the evaporated moisture does not recondense on the seed cotton. This is analogous to the current situation where natural gas combustion products are used to heat seed cotton and the solutions are substantially the same. In other words, air is allowed to escape from the conduit 38 in a conventional manner at conventional locations, such as in the inclined cleaner 22, in other cleaners downstream from the heater 64, from conventional battery condensers (not shown) and the like. In general, the sooner the water evaporated off the seed cotton is allowed to escape from the gin conduits and components, the better because there is less chance of the water recondensing on the seed cotton. In practice, allowing the water vapor to escape through the inclined cleaner 22 has proven satisfactory, at least partly because it takes only 4-5 seconds for cotton to reach the inclined cleaner 22 from the heater 64.

Connected to the inclined cleaner 22 is a cotton outlet 90 leading to the gin stands 24. Cotton exiting from the gin stands 24 passes through a conduit 92, through additional cleaning equipment (not shown) and then to a baler 94. In other words, the seed cotton, downstream of the heater 64, is handled in a conventional manner. Air exiting from the inclined cleaner 22 may pass through a fan 94 and then into the cyclone 26 where conveying air is separated from dust and trash to prevent a large dust cloud emitting from the gin 10.

It is desirable to rehumidify cotton lint before or during baling because extremely dry cotton lint does not pack readily into bales. A preferred source for water vapor to rehumidify cotton lint is any location where high humidity air is being vented from the air conveying system 16, e.g. downstream of the inclined cleaner 22 through a conduit 96 having a control valve 98 therein.

It will be apparent that the wave energy heater may be incorporated into one or more of the ducts 38, preferably upstream of the first separator 20. As suggested previously, it is desirable to use polygonal ducts, such as square or rectangular rather than circular, as a conduit for the heater to here In some embodiments, the wave energy heater may be located at other locations or in conjunction with other equipment in a conventional cotton gin. Referring to FIG. 4, a conventional belt or chain conveyor 100 includes an enclosed housing 102 inside which a belt or chain 104 is driven around a pair of pulleys 106, 108. At an inlet end 110 of the conveyor 100 is an air lock 112 while an air lock 114 is at an outlet end 116 of the conveyor 100. The belt or chain conveyor 100 will be recognized by those skilled in the art as conventional. In some embodiments, the housing 102 conveniently includes a relatively flat upper wall 118 on which are mounted a series of wave generators 120, such as microwave generators, mounted on wave guides 122. The capacity and dispersion of the wave generators 120 is essentially the same as with the wave generators 66. The belt conveyor 100 may be used to transport seed cotton in a conventional manner in a conventional location in a cotton gin while the wave generators 120 convert the conveyor 100 into a combined conveyor and heater. The belt conveyor 100 can be substituted for a feed controller because it can be slowed down to accumulate seed cotton or speeded up to keep the gin stands loaded.

Figure 5:
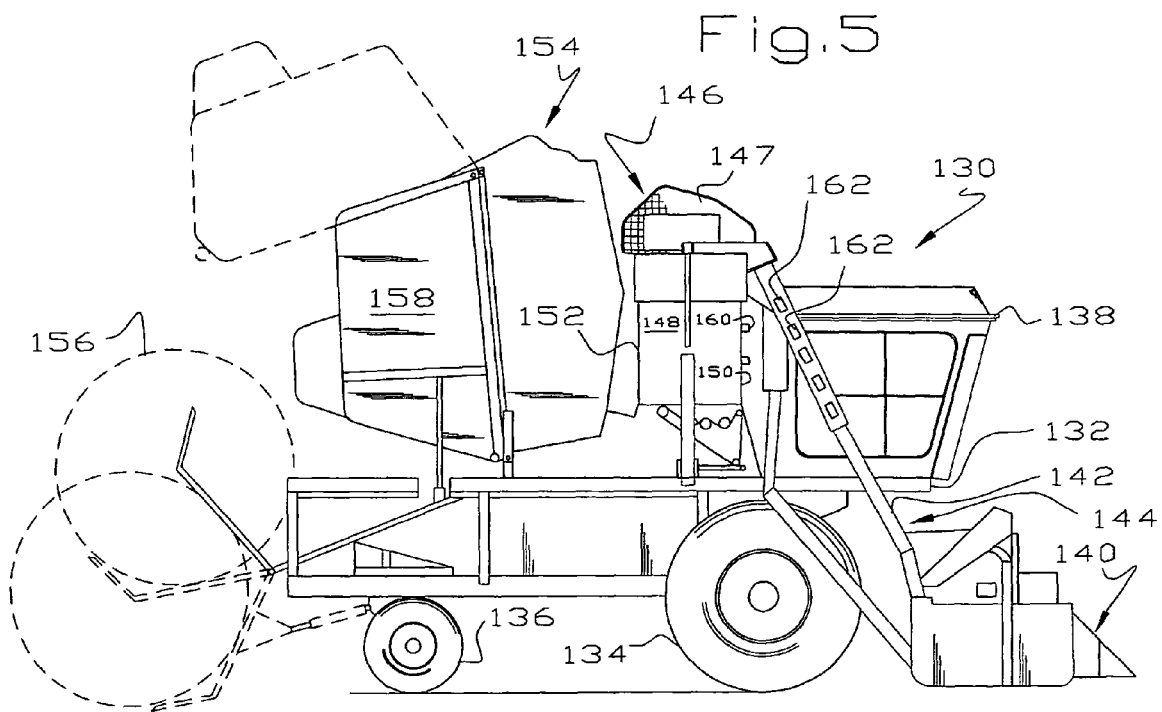
FIG. 5 is a cross-sectional view of a cotton picker equipped with a seed cotton dryer.

Referring to FIG. 5, there is shown a conventional cotton picker 130 that is illustrated in greater detail in U.S. Pat. No. 6,263,650, to which reference is made for a more complete description of the conventional aspects thereof. The particular cotton picker 130 illustrated in U.S. Pat. No. 6,263,650 includes a main frame 132 supported for movement by forward drive wheels 134 and rear steerable wheels 136. An operator's station 138 is supported at the front end of the main frame 132 above forwardly mounted harvesting structure 140 which removes cotton from plants and directs the removed cotton into a duct 142, which preferably has flat sides, of an air conveying system 144. The air conveying system 144 delivers seed cotton and trash into an accumulator 146 which includes an upright box having an open or screened top 147, side walls 148, a front wall 150 and a rear wall 152, which are conveniently flat. Seed cotton and trash collecting in the accumulator 146 are ultimately fed into a hopper 154 where the seed cotton is formed into a round module 156 at least partially enclosed by a plastic cover (not shown). When the module 156 is completely formed, a closure 158 of the hopper 154 opens thereby discharging the module 156 to the rear of the picker 130.

Those skilled in the art will recognize the device of FIG. 1 as being exemplary of modern cotton pickers.

To incorporate a wave energy drying technique to some embodiments of the picker 130, advantage is taken of the size, location and shape of the accumulator 146. Specifically, a series of wave energy generators 160 can be affixed to one or more of the accumulator walls 148, 150, 152, depending on ease of installation and access. In some embodiments, the generators 160 are fixed to the front wall 150 to heat seed cotton and trash and thereby reduce its moisture content.

In other embodiments, the generators 160 are affixed to two or more of the walls 148, 150, 152 to obtain adequate penetration of the wave energy into seed cotton in the accumulator 146 because conventional accumulators tend to be large rectangles, such as 2'-3'×8' and quite deep rather than flat, as in the case of the heating conduit 46 and the belt conveyor 100. Heating the seed cotton in the accumulator 146 causes some of the moisture to evaporate. Because there is a tendency for moisture to build up in the accumulator 146, moist air may be removed through a screen in the bottom of the accumulator 146 or some other suitable location.

In some embodiments, generators 162 can be affixed to the duct 142 to heat the seed cotton before it enters the accumulator 146. This is of particular advantage because the top 147 of the accumulator 146 is typically open or screened thereby allowing the conveying air and evaporated water to exit from the picker 130.

Drying seed cotton immediately after being harvested has a number of advantages. When seed cotton is picked from the boll, it is as fluffy as it will ever be, meaning that air flow through or around the picked tuft has the easiest time circulating adjacent water droplets adhering to the cotton fibers. Cotton fibers are highly absorbent, or hygroscopic, meaning that water becomes intertwined with the cotton on a molecular level. The longer a water droplet remains in contact with the fibers, and the more the crop is compacted, the more water is absorbed and the more difficult it is to finally remove by heating. Drying crops as they are being harvested minimizes the absorption of water into the body of the crop and makes thermal drying more effective.

It is not necessary to remove all, or even a majority, of the water content of agricultural products as they are being harvested. Many advantages accrue to reducing the water content, even modestly. It often happens that harvesting is delayed in the mornings for a hour or so, waiting for the measured water content of the product to decline 1% from just over an accepted value to the maximum accepted value. Use of wave energy dryers in pickers allows considerably longer harvesting operations during each day because harvesting will no longer be quite so restricted by high moisture content of crops. This feature is particularly desirable to custom picker operations and to Gulf Coast farmers where the potential of hurricanes sometimes makes picking for long hours particularly desirable. At times of pending inclement weather where the crops must be harvested or loss, the ability to dry seed cotton as it is being harvested may add as much as ten percent to the value of the cotton lint because there is much less loss of quality.

Figure 6:
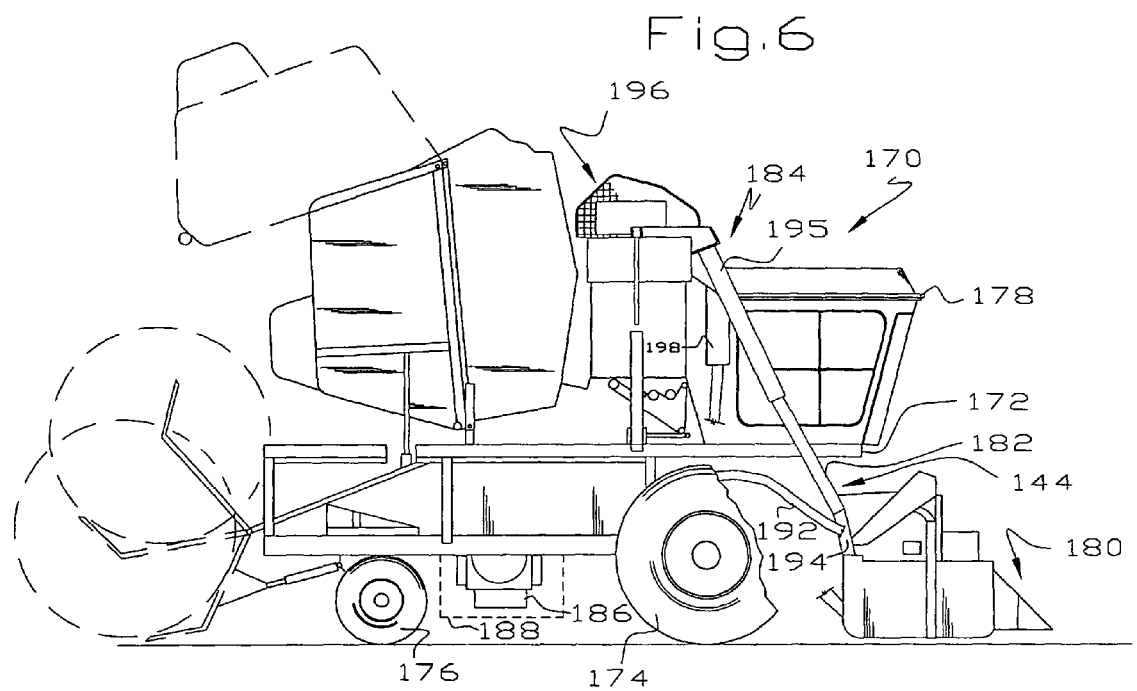
FIG. 6 is a side view of a cotton picker that has been modified to incorporate a new drying technique, certain parts being broken away to illustrate some of the components of the dryer.
Figure 7:
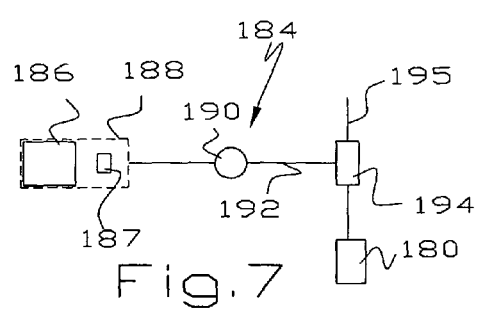
FIG. 7 is a schematic view of one embodiment of a drying system.

Referring to FIG. 6, there is shown another view of the conventional cotton picker that is illustrated in greater detail in U.S. Pat. No. 6,263,650, to which reference is made for a more complete description of the conventional aspects thereof. The particular cotton picker 170 includes a main frame 172 supported for movement by suitable front drive wheels 174 and steerable rear wheels 176. An operator's station 178 is supported at the front end of the main frame 172 above forwardly mounted harvesting structure 180 which removes cotton from plants and directs the removed cotton into a flat sided duct 182 of an air conveying system 184. As shown in FIGS. 6 and 7, an engine 186 is provided to propel the cotton picker 170 and provide a source of power for the auxiliary energy consuming components of the cotton picker.

Those skilled in the art will recognize the device of FIG. 6, as heretofore described, as being exemplary of modern cotton pickers.

In some embodiments, the engine 186 is a Tier 3, Tier 4 or less polluting diesel engine. A shroud 188 covers the engine 186 and/or its conventional radiator 187. One or more fans 190 draw air across the engine 186 and/or its radiator and through the shroud 188 and force the air through a conduit 192 into a venturi like device 194 inside the duct 192. It will be seen that air drawn through the shroud 188 is heated by the hot engine 186 or its radiator 187. Those skilled in the art will recognize the venturi like device 194 because it is similar or identical to that used in conventional air conveying systems 184. Thus, a large quantity of heated conveying air causes a low pressure area in the duct 192 adjacent the harvesting structure 180. Atmospheric air is thereby drawn through the harvesting structure 180 and a mixture of heated conveying air from the duct 192, atmospheric air, seed cotton and trash are delivered through the duct 195 into the downstream components of the cotton picker 170.

It will be recognized that the cotton picker 170 is exemplary of devices that produce a round or generally cylindrical cotton module wrapped with a plastic cover although it will also be recognized that this apparatus can be used on other style cotton pickers, grain combines and other harvesting equipment that are powered by modern diesel engines where it is desirable to dry, or partially dry, the crop during harvesting. The conveyed seed cotton, trash and heated conveying air are separated in or adjacent the accumulator 196 in the same manner as cotton pickers are currently operated. It will be recognized that some of the conveying air used in the system 184 may come from a fan (not shown) delivering air through a duct 198 having an outlet in the harvesting structure 180 in a conventional manner.

Figure 8:
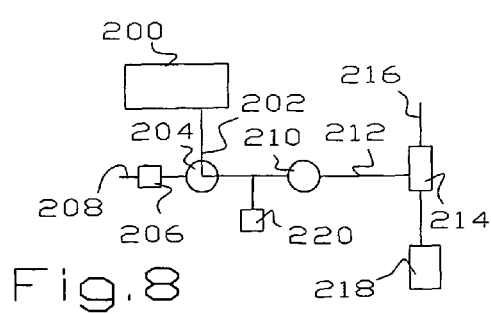
FIG. 8 is a schematic view of another embodiment of a drying system.

In some embodiments, as shown in FIG. 8, hot exhaust gas from a Tier 3, Tier 4 or less polluting diesel engine 200 passes through an exhaust 202 and is delivered through a valve 204 having one outlet connected to a conventional muffler 206 and exhaust pipe 208. Thus, with the valve 204 directing exhaust gas to the muffler 206, the cotton picker operates in a conventional manner. In some embodiments, a separate conveying air system, analogous to FIG. 7, may be provided so the conveyed seed cotton, trash and conveying gas are separated in or adjacent the accumulator in the same manner as cotton pickers are currently operated.

With the valve 204 in the position shown in FIG. 8, hot exhaust gas from the diesel engine 200 is propelled by a fan 210 into a duct 212 which connects to the venturi like device 214, analogous to the device 194, inside the duct 216. Thus, the device of FIG. 8 operates to provide hot exhaust gas as all or part of the conveying gas to produce a low pressure area adjacent the harvesting structure 218 to thereby propel seed cotton and trash toward the downstream elements of the cotton picker, namely toward its accumulator. Preferably, the location of the venturi like device 214 is as close as possible to the harvesting structure 218 so the amount of atmospheric air drawn in with the cotton is small when compared to the amount of hot exhaust gas from the fan 210. This minimizes the amount of potentially high humidity air drawn in with the seed cotton and trash. A substantial advantage of the venturi like device 214 is that it produces slippage, i.e. a high velocity hot exhaust gas that is moving faster than the seed cotton and trash drawn into the duct 216. Because of the higher velocity of the hot exhaust gas, the seed cotton and trash is exposed to more drying gas. In some embodiments, one or more pressure relief valves 220 can be incorporated to deal with overpressure situations in a manner that relieves any back pressure on the engine 200 without affecting the harvesting operation.

Because the conveying gas is partly or wholly hot diesel exhaust, considerable drying of the crop will occur during transit toward the accumulator. It will be seen that the conveyed seed cotton, trash and conveying gas are separated in or adjacent the accumulator in the same manner as cotton pickers are currently operated because the top of the accumulator is either open or screened.

Tier 3 and Tier 4 diesel engines produce an exhaust having the following pollutant profiles:

| Tier 3 diesel engines | |
|---|---|
| pollutant | quantity grams/kilowatt-hour |
| non-methane hydrocarbons + oxides of nitrogen | 4.0 |
| carbon monoxide | 3.5 |
| particulate matter | 0.2 |

| Tier 4 diesel engines | |
|---|---|
| pollutant | quantity grams/kilowatt-hour |
| non-methane hydrocarbons | 0.19 |
| oxides of nitrogen | 3.5 |
| carbon monoxide | 0.4 |
| particulate matter | 0.02. |

It will accordingly be seen that directly contacting crops with the exhaust from Tier 3, Tier 4 or less polluting diesel engines causes considerable drying of the crop without damaging the crop or imparting an objectionable odor to the crop.

Figure 9:
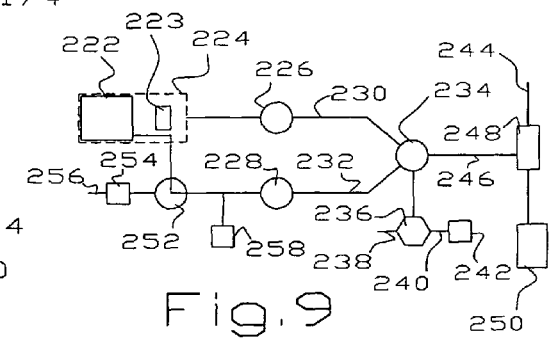
FIG. 9 is a schematic view of a preferred drying system.

Referring to FIG. 9, there is illustrated a system combining hot diesel exhaust and conveying air drawn from around a Tier 3 or Tier 4 or less polluting diesel engine 222 and/or its radiator 223 inside a shroud 224. To these ends, the fans 226, 228 connect to ducts 230, 232 connected to a proportioning valve 234 that mixes air from the fan 226 and exhaust gas from the fan 228 in suitable proportions in any suitable manner, as by a control device 236 acting to speed up or slow down one or more of the fans 226, 228. Operation of the proportioning valve 234 is preferably controlled automatically by a control device 236 such as a computer or calculating unit having an input 238 which may be adjusted by the operator to select a desired temperature, and/or a desired humidity level and/or other parameters. It will be apparent that the proportioning valve 234 may be eliminated provided the control unit 236 has the capacity to individually adjust operation of the fan 226, i.e. taking all the exhaust gas from the fan 228 and mixing it was some or all of the air from the fan 226.

The control unit 236 also includes an input 240 from a sensor 242 located at an appropriate location, such as in the duct 244, which measures temperature, humidity and/or other parameters. A mixture of conveying air and diesel exhaust leaves the proportioning valve 234 and is delivered to the duct 246, the venturi like device 248 and the duct 244 to propel seed cotton and trash from the harvesting structure 250 toward the accumulator. As in the embodiment of FIG. 8, the diesel engine exhaust may be equipped with a control valve 252, conventional muffler 254 and exhaust pipe 256 to provide for conventional operation. One or more pressure relief valves 258 can be incorporated to deal with overpressure situations in a manner that relieves any back pressure on the engine 222 without affecting the harvesting operation. One or more pressure relief valves 258 can be incorporated to deal with overpressure situations in a manner that relieves any back pressure on the engine 222 without affecting the harvesting operation.

In other embodiments, exhaust gas from the fan 228 and air from the fan 226 may be separately connected to one or more venturi like devices in the duct 244 leading to the accumulator of the cotton picker.

Figure 10:
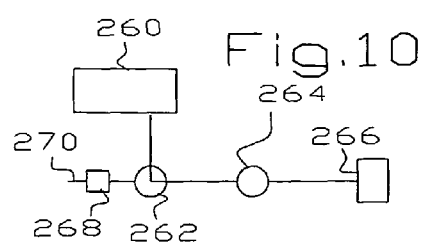
FIG. 10 is a schematic view of another drying system.

Referring to FIG. 10, a suitably non-polluting diesel engine 260 delivers exhaust gas to a control valve 262 and then to a fan 264 connected into or immediately upstream of the accumulator 266 of the cotton picker to dry seed cotton temporarily in the accumulator 264. As in other embodiments, the engine 260 may be provided with a conventional muffler 268 and exhaust pipe 270.

Operation of the various embodiments will now be apparent. Hot conveying gas is delivered through the duct into the venturi like device thereby creating a low pressure area in the duct and drawing atmospheric air across the harvesting structure thereby propelling seed cotton and trash through the duct into the accumulator.

Thus, in the cotton pickers shown in FIGS. 8-9, exhaust gas from the diesel engines 200, 222 simultaneously conveys and heats seed cotton in transit between the harvesting structures 218, 250 and the accumulators. In the preferred cotton picker of FIG. 9, the amount of exhaust gas from the fan 228 and/or the amount of air from the fan 226 can be adjusted to produce a mixture that is (1) low enough in temperature so as not to damage the cotton lint or the cotton seed, (2) high enough in temperature to evaporate water off of the seed cotton and trash and (3) low enough in relative humidity to carry off the evaporated water without allowing it to recondense. In other embodiments having an auxiliary diesel engine used to power auxiliary equipment, the exhaust gas from the auxiliary diesel engine may be used for these purposes.

It will also be recognized that these drying mechanisms can be incorporated into other types of cotton pickers other than the type producing a round module wrapped with a plastic cover.

In a combine of the type used to harvest grain crops, the diesel exhaust may be directed into a chute or conduit where grain is being conveyed away from the header or into a bin where the grain is temporarily collected. Similarly, this technique may be incorporated into a nut harvester, such as those used to harvest almonds or pistachios, by directing the hot diesel exhaust into a chute or conduit where the nuts are being conveyed away from the harvesting structure or into a bin where the nuts are temporarily collected.

One may initially think that running the exhaust gas from the diesel engine through such a system will produce too much back pressure on the engine thereby degrading its performance. It will be seen that the fan 228, for example, produces a sufficiently low pressure to allow the engine 222 to operate efficiently. It may be advantageous to operate the drying capability of such a picker at all times or it may be advantageous to turn off the drying capability after the crop naturally dries out from the sun. This may be accomplished, of course, by manipulating the valves 204, 252 and delivering exhaust gas through the mufflers 206, 254 and exhaust pipe 208, 256 to the atmosphere. It may be advantageous to warm up the diesel engine 200, 222 at the beginning of operations and purge the ducts and/or accumulator of any water that condensed from the previous day's operations.

Drying cotton, grains, hay or silage and nuts immediately after being harvested has a number of advantages. When seed cotton is picked from the boll, it is as fluffy as it will ever be, meaning that air flow through or around the picked tuft has the easiest time circulating adjacent water droplets adhering to the cotton fibers. Cotton fibers are highly absorbent, or hygroscopic, meaning that water becomes intertwined with the cotton on a molecular level. The longer a water droplet remains in contact with the fibers, and the more the crop is compacted, the more water is absorbed and the more difficult it is to finally remove by heating. Drying crops as they are being harvested minimizes the absorption of water into the body of the crop and makes thermal drying more effective.

It is not necessary to remove all, or even a majority, of the water content of agricultural products as they are being harvested. Many advantages accrue to reducing the water content, even modestly. It often happens that harvesting is delayed in the mornings for a hour or so, waiting for the measured water content of the product to decline some modest amount, e.g. 1%, from just over an accepted value to the maximum accepted value. Drying crops in this manner allows considerably longer harvesting operations during each day because harvesting will no longer be quite so restricted by high moisture content of crops.

There is not thought to be any substantial fire hazard for a variety of reasons. First, in gin operations, conventional natural gas fired heaters expose seed cotton and trash to elevated temperatures in the presence of air without scorching the cotton fibers or starting fires. Second, the diesel exhaust can be mixed with ambient air to provide a relatively hot gas stream that is oxygen deficient because the oxygen in the exhaust gas is much reduced when compared with normal oxygen in air.

Although Tier 3 and certainly Tier 4 diesel engines produce an exhaust which can acceptably be directly contacted with a crop, including those for human consumption, it is possible to retrofit earlier model diesel engines with a heat exchanger heated by hot exhaust gases to provide a source of heat for drying crops during harvesting. In such an embodiment, air heated by the heat exchanger is directly contacted with the harvested crop to thereby reduce its moisture content.

Although this invention has been disclosed and described in its preferred forms with a certain degree of particularity, it is understood that the present disclosure of the preferred forms is only by way of example and that numerous changes in the details of operation and in the combination and arrangement of parts may be resorted to without departing from the spirit and scope of the invention as hereinafter claimed.

I claim:

1. A cotton gin comprising a module feeder, a cotton dryer, an air conveyor receiving cotton clumps from the module feeder and delivering them to the dryer, a separator/cleaner downstream from the cotton dryer, and a plurality of gin stands receiving seed cotton from the separator,
    the cotton dryer comprising a conduit adapted to pass seed cotton therethrough, and an array of electromagnetic wave energy generators on the conduit producing an energy density in the range of two tenths to six kilowatts of energy per pound of seed cotton whereby leaves and stems are more efficiently removed from cotton seeds and lint in the separator/cleaner,
    the air conveyor including a first air lock upstream of the dryer allowing conveying air and cotton clumps to pass through the first air lock into the dryer and a second air lock downstream of the dryer allowing conveying air and cotton clumps to pass through the second air lock out of the dryer thereby preventing discharge of electromagnetic wave energy from the dryer, the first and second air locks comprising a housing having a rotary array of wipers therein.

2. The cotton gin of claim 1 further comprising a feed controller between the module feeder and the separator/cleaner and wherein the dryer conduit is part of the feed controller.

3. A cotton gin comprising a module feeder, a cotton dryer, an air conveying system connecting an output of the module feeder to the dryer, a separator/cleaner downstream from the cotton dryer, and a plurality of gin stands receiving seed cotton from the separator, the cotton dryer comprising a conduit adapted to pass seed cotton therethrough, and an array of electromagnetic wave energy generators on the conduit producing an energy density in the range of two tenths to six kilowatts of energy per pound of seed cotton whereby leaves and stems are more efficiently removed from cotton seeds and lint in the separator/cleaner;
    a shroud around an exterior of the wave energy generators having an inlet open to the atmosphere and an outlet and
    a conduit connecting the shroud outlet to the air conveying system whereby air heated by heat exchange with the wave energy generators heats cotton clumps from the module feeder.

4. The cotton gin of claim 1 wherein a cross-section of the conduit comprises a series of flat walls.

5. The cotton gin of claim 4 wherein the conduit is rectangular in cross-section.

6. A cotton gin comprising a module feeder, a cotton dryer receiving cotton clumps from the module feeder, a separator/cleaner downstream from the cotton dryer, and a plurality of gin stands receiving seed cotton from the separator, the cotton dryer comprising a conduit adapted to pass seed cotton therethrough, the conduit being rectangular in cross-section and being 4-10 times wider than deep, and an array of electromagnetic wave energy generators on the conduit producing an energy density in the range of two tenths to six kilowatts of energy per pound of seed cotton whereby leaves and stems are more efficiently removed from cotton seeds and lint in the separator/cleaner.

7. A cotton gin comprising a module feeder, a cotton dryer receiving cotton clumps from the module feeder, a separator/cleaner downstream from the cotton dryer, and a plurality of gin stands receiving seed cotton from the separator, the cotton dryer comprising
    a conduit adapted to pass seed cotton therethrough, the dryer conduit being of metal having an inner lining of low dielectric property thereby preventing arcing in cotton flowing therethrough, and an array of electromagnetic wave energy generators on the conduit producing an energy density in the range of two tenths to six kilowatts of energy per pound of seed cotton whereby leaves and stems are more efficiently removed from cotton seeds and lint in the separator/cleaner.

8. The cotton gin of claim 1 wherein the generators are located on an energy distributing zone and have the capacity to produce an energy density in the energy distributing zone in the range of 0.3-10 kilowatts per square foot.

9. The cotton gin of claim 1 wherein the generators are microwave generators having a wave length of 4.5-24 inches.

10. The cotton gin of claim 1 wherein the generators are radio frequency generators having a wave length of 300 mHz-2450 mHz.

11. The cotton gin of claim 1 further comprising a cotton parameter sensor downstream of the dryer, a control unit connected to the parameter sensor and to the wave energy generators whereby the control unit changes the amount of energy delivered by the wave energy generators in response to the sensor.

12. A cotton gin comprising a module feeder, an air conveying system receiving cotton clumps from the module feeder and transporting them through the gin, a flow controller in the air conveying system for accumulating a quantity of seed cotton and providing a surge capacity for gin stands, the flow controller comprising a conduit, a cotton dryer receiving cotton clumps from the module feeder, a separator/cleaner downstream from the cotton dryer and a plurality of gin stands receiving seed cotton from the separator/cleaner, the flow controller comprising a feed back loop from the gin stands controlling flow of cotton from the flow controller, the cotton dryer comprising an array of electromagnetic wave energy generators in an energy distributing zone on the flow controller conduit having the capacity to produce an energy density in the range of 0.3-10 kilowatts per square foot.

13. The cotton gin of claim 1 wherein the dryer conduit includes an inner surface of low dielectric property thereby preventing arcing in cotton flowing therethrough.

14. The cotton gin of claim 1 further comprising a shroud around an exterior of the wave energy generators having an inlet open to the atmosphere and an outlet and a conduit connecting the shroud outlet to the air conveying system whereby air heated by heat exchange with the wave energy generators heats cotton clumps from the module feeder.

15. The cotton gin of claim 1 further comprising a flow controller in the air conveying system for accumulating a quantity of seed cotton and providing a surge capacity for gin stands, the dryer conduit comprising part of the flow controller.

* * * * *